United States Patent Office 2,971,149
Patented Feb. 7, 1961

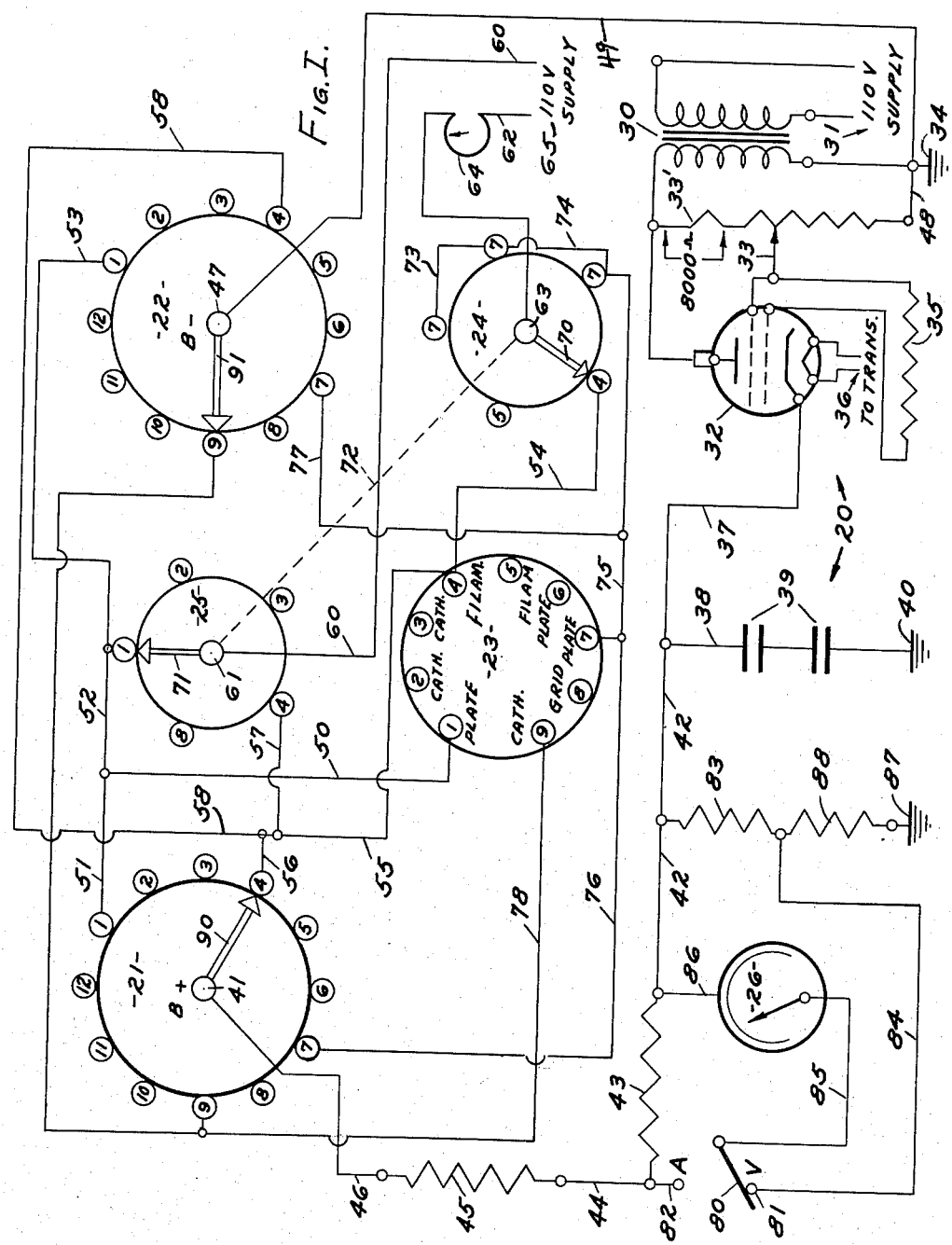

2,971,149

ELECTRONIC TUBE TESTING DEVICE

Russell A. Henderson, 4026 W. Vernor Highway,
Detroit, Mich.

Filed Oct. 24, 1958, Ser. No. 769,352

10 Claims. (Cl. 324—23)

This invention relates to a method and apparatus for checking, rejuvenating, de-shorting and otherwise treating and testing electronic tubes and cathode ray tubes which are defective or run-down as to emission characteristics.

Various tube checkers and emission rejuvenation devices have been used in the prior art, however, the several devices of the prior art are not entirely satisfactory due to the fact that they do not provide the necessary cross-circuits for crossing and reversing the circuits between all the tube elements not only in their normal circuits but also out of their normal circuits to insure that a check has been made between each element under current and voltage conditions which are suitable to burn out the shorts and remove coatings, etc.

It is therefore an object of the invention to provide a tube checking device and method for eliminating shorts between elements of a tube which is capable of placing all elements of the tubes in circuit with the power supply and relative to each other to determine the presence of shorts and their location by crossing the circuits of all tube elements regardless of whether or not the elements normally lie in a circuit when the tube is in use.

An object of the invention is to provide means and a method for subjecting the electronic emitting cathodes and plates to a high-pulse direct current whereby they are rejuvenated such as by breaking off oxidation coatings.

An object of the invention is to provide a method and means for subjecting the various elements to a high-pulse direct current so that oxidation and foreign particles lodged between or on the elements are burned off due to the fact that they are subjected to current in a circuit in which they are not normally included.

An object of the invention is to carry out the tests with the tube located in the position it occupies in operation so that dislodged particles falling with gravity will not be later reactivated.

An object of the invention is to provide a high potential differential across an element in an electron tube relative to any other element.

An object of the invention is to provide a means and a method for placing a high potential between the elements in correct polarity sequence so that the test will show a potential break down or short which can be burned out by the tapping of the tube envelope with an appropriate hammer or tapper so that automatic rejuvenation occurs with the high direct current pulse peaks dislodging the emitter oxidation coating and contamination.

An object of the invention is to provide means and method for making predetermined leakage and emission checks between elements suspected of deficiency by the application of correct polarity voltage which is read in milliamperes of current on the meter and to provide a volt meter having a voltage reading in proportion with the variable power supply to indicate direct, partial, or intermittent shorts with fluctuation of the meter acting as an indicator of the tube condition before and after repair procedure.

An object of the invention is to provide a method and means for predetermining the presence of shorts in tubes which have not been used or which are under tests and prior to installation by applying the voltages and potential differentials across and between all the elements and by tapping the tube at the same time to determine whether or not shorts are present or potentially present.

An object of the invention is to provide means and a method for applying 920 volt, 280 milliampere current which can drain the full output of the voltage supply and provide a method and means for automatically checking shorts.

An object of the invention is to provide a high direct current pulse applied with direct current potential between and across the cap (control or No. 1 grid) to promote rejuvenation with the oxidation coating breaking off the emitter element in only one operation such as by the application of the current and voltage and by the tapping of the tube envelope.

An object of the invention is to provide two multi-contact single throw switches adapted to be connected to various tube socket poles with the switches being actuated separately in any desired position so that all elements of a tube can be placed under potential of correct polarity, incorrect polarity, or any combination.

These and other objects of the invention will become apparent by reference to the following description of a tube checker and rejuvenator device and method embodying the invention taken in connection with the accompanying drawing in which:

The single figure is a schematic wiring diagram showing the device.

Referring now to the drawing wherein like numerals refer to like and corresponding parts throughout the several views, the tube checker, rejuvenator, and de-shorting normal current flow and reverse current flow device and method disclosed therein to illustrate the invention comprises a high pulse direct current power supply generally designated 20 having its B plus side connected to the independently operated multi-position switch 21 and its B minus side connected to the independently operated multi-position switch 22, which switches are cross-connected to the tube socket 23 via leads disposed between the like numbered poles of the switches 21 and 22 and like numbered poles of the socket 23 to supply current to the socket 23 poles. Two separately powered, connected, gang-operated switches 24 and 25 have numbered poles also connected to the tube socket 23 like poles for independently supplying current to the socket 23 poles or for independently or conjunctively supplying superimposed current on the current received by the socket 23 poles via the switches 21 and 22 so that the elements of an electronic or cathode ray tube disposed in a socket 23 and connected to the poles of the socket 23 can be subjected to normal current or reverse current via selectively operating the switches 21 and 22 independently selectively operating the gang-switches 24 and 25, or by combined operation of the switches with the results being visually seen in the tube and readable upon the meter 26 so that the elements of the tube can be checked for shorts, the shorts broken down, and elements rejuvenated for emission by placing the tube elements in their normal circuits and by crossing the elements of the tube out of their normal circuits to connect elements not normally circuited. Switches 24 and 25 are present also to supply the tube under test with the recommended filament and/or heater voltages and current.

More particularly, the power supply 20 comprises a transformer 30 powered by 110 volt leads 31 to its primary with the secondary connected to the rectifier tube 32 via 8000 ohm resistor 33' and the high A.C. potentiometer 33 with both the secondary and potentiometer being grounded at 34 and the resistor 35 disposed between the tube 32 grid and the potentiometer 33 with the tube 32 receiving supply to its plates from the transformer via the leads 36 with the 920 volt 280 milliampere B plus current from the tube 32 being fed via leads 37 and 38 past the condensers 39 which are grounded at 40 to develop a high-pulse unfiltered D.C. voltage which is fed to the switch 21 center pole 41 via the lead 42—20 ohm resistor 43, lead 44, 1000 ohm-20 watt resistor 45, and lead 46. The B minus current is fed to the switch 22 center pole 47 via the lead 48 from the potentiometer 33, and transformer 30 secondary and lead 49 and it can now be seen that the switches 21 and 22 are the polarized distribution points for the power supply 20 to the tube socket 23.

Each number pole 1 to 9 of the tube socket 23 is connected by leads to like numbered poles 1 to 9 of the switches 21, 22, 24, and 25 such as by the leads shown as easily understood but only a few such connections are set forth by way of specific example. Tube socket 23 pole 1 is connected to switch 21 pole 1 via leads 50 and 51; to switch 25 pole 1 via leads 50 and 52; to switch 22 pole 1 via leads 50, 52, and 53. Tube socket 23 pole 4 is connected to switch 24 pole 4 via lead 54; to switch 21 pole 4 via leads 55 and 56; to switch 25 pole 4 via leads 55 and 57; and to switch 22 pole 4 via leads 55 and 58.

The switches 24 and 25 are disposed between the sides of a separate power supply such as variable 110 volt A.C., or other suitable variable power supply, such as by the lead 60 to the switch 25 center pole 61 and the lead 62 to the switch 24 center pole 63 with the rheostat 64 being disposed in the lead 62 and it can now be seen the switches 24 and 25 are on opposite sides of the supply 65 with the tube socket 23 poles wired therebetween as hereinbefore set forth so that the numbered poles of the socket 23 can be connected through the elements of the tube and the elements subjected to the power supply 65. The arms 70 and 71 of the switches 24 and 25 respectively are preferably mechanically interconnected as at 72 for synchronized rotation and it is to be noted that switch 25 has poles 1, 2, 3, 4, and 8 while switch 24 has poles 7, 7, 7, 4, and 5 with the poles and connections being co-ordinated to selected tube elements. Switches 24 poles 7, 7, 7, are interconnected by the leads 73 and 74 and connected to socket 23 pole 7 via lead 75. Socket 23 pole 7 is connected to switch 21 pole 7 via the lead 76 and connected to switch 22 pole 7 via leads 75 and 77. Lead 78 interconnects poles 9 of switches 21 and 22 and socket 23.

The reaction of a tube disposed in the socket 23 is readable on the voltage-amperage meter 26 in volts with the switch 80 in the position shown closed on contact 81 and is readable in milliamperes when switch 80 is closed on contact 82. The meter 26 is disposed in the B plus side of the power supply 20 via the 1000 ohm, 20 watt resistor 83, lead 84, contact 81, switch 80, and leads 85 and 86 across lead 42 for reading voltage with the circuit being grounded at 87 through 100,000 ohm, 10 watt resistor 88. The meter 26 is connected for reading current via leads 86, 85, switch 80, contact 82 across-parallel the resistor 43.

For purposes of simplicity only one socket 23 is shown and described but in practice several different size sockets 23 are connected between the switches so that any style tube can be placed in the device by placing it in its proper socket and the type socket disclosed is for illustrative purpose only.

In operation, a tube is placed in the socket 23 so that the socket poles are connected to the tube elements such as shown on the drawing. The switches 21 and 22, arms 90 and 91, respectively are placed on the desired poles such as 4 and 1 respectively and this places the power across a filament and a plate of the tube and the potentiometer 33 is then adjusted and the tube tapped manually or with a hammer to activate the tube elements and to dislodge foreign matter.

The sequence of filament selections has to be maintained to heat the tube for test. The switch 24 and 25 positions are independent of B voltages but at the same time test between filament and other elements for shorts or leakage. Switches 24, 25 are filament supplies in combination with rheostat 64 and the filament voltage and is independent of switches 21 and 22 power supply 20. It is obvious that power supplies 20 and 65 can be superimposed.

In checking and rejuvenating a tube such as with nine elements, the switch 21 and arm 90 is located on pole 1 and switch 22 arm 91 sequentially or otherwise placed on poles 2, 3, 4, 5, 6, 7, 8, and 9 thereby circuiting each element of the tube with the plate 1. The switch 21 arm 90 is then placed on pole 2 and switch 22 arm 90 then sequentially or otherwise placed on poles 3, 4, 5, 6, 7, 8, and 9 thereby circuiting each element of the tube with the cathode 2. During these operations the potentiometer 33 is manipulated to avoid short circuiting the device. The switches 21 and 22 can be turned backwards from like poles or the potentiometer 33 cut to null when passing like poles. The gang switches 24 and 25 can be operated as desired relative to switches 21 and 22.

By placing the switch 21 arm 90 on pole 7 and switch 22 arm 91 on pole 8 the plate and grid are circuited and by moving the switches 24 and 25 to the right from the position shown through a cycle the additional elements are circuited separately or in combination such as grid 4 and plate 1; filament 5 and cathode 2; plate 7 and cathode 3; plate 7 and filament 4; the plate 7 and grid 8. These circuits in conjunction with potentiometer 33 adjustment and rheostat 64 adjustment in combination with tube tapping subjects the tube to all normal and possible short circuits and in the event there is a short circuit between any elements of the tube it will be discovered and by applying adjusted power the short circuit can be usually burned out and also the tube accumulations of matter developed by tube operation can be dissipated as well as foreign matter inadvertently included in the manufacture of the tube.

The inventive tube tester, emission rejuvenation, short finder, and short eliminator device and method constitutes an easily operated system and device which can easily and quickly test any tube by merely locating the tube in a proper socket 23 and manipulating the switches and it is obvious that a relay lock-out can be added to eliminate short circuiting between the like poles of opposed switches if desired.

While certain voltages and currents have been stated in conjunction with the disclosure of the device it is obvious that others can be used and greater voltages and currents can be used for older type tubes or tubes with elements spaced farther apart.

In reading the meter 26, voltage readings in proportion with the variable supply indicate direct, partial, or intermittent shorts; any fluctuation of the meter acts as an indicator of the tube condition, before and after repair procedure. Any deflection on the meter in milliamperes indicates leakage shorts with normal current going with the polarity applied via B supply. After a successful shortage breakdown between elements of a tube, the tube will easily pass the tube checker reading tests of those meg-ohms which is the highest test as presently applied for service in the television and radio maintenance field.

Generally maximum voltage is applied if the tube under test is adaptable to such and does not show a short before tapping of the tube is applied. Tube damage under test is negligible or non-existent unless the tube elements are non-concentric or the mountings are loose. If the tube is weak only, the cathode is made negative and the control or number one grid is flashed positive several times as various voltages according to the required oxidation breakdown. Emission checks are made between the elements suspected of openings or breaks internally of the tube and these are detected by applying current forwarding potentials of varying voltages between the selected elements. Voltage to the plate directly and to the screen grid and control grid through series fixed resistor 33' and variable potentiometer 33 through series fixed resistor 35 to the control grid of rectifier tube 32 pentode acts as a variable diode rectifier in testing tubes.

Although but a single embodiment of the invention has been shown and described, it is obvious that many changes may be made in the size, shape, detail, and arrangement of the various elements of the invention within the scope of the appended claims such as by using other selected poles in the switches 24 and 25, operating them independently, or gang operating the switches 21 and 22 for a particular tube in high volume production all singly or in combination.

I claim:

1. In a device of the class described, the combination comprising: a tube socket provided with element poles for connection to the filament, cathode, grids and plate elements of a tube inserted in the socket; a high-pulse direct current power supply; a first switch means interconnected between one side of said high-pulse direct current power supply and said tube socket and being operable to connect said one side of the high-pulse direct current power supply to a selected one of said element poles; and, a second switch means interconnected between the other side of said high-pulse direct current power supply and said tube socket and being operable to connect said other side of the high-pulse direct current power supply to a selected one of said element poles, whereby, said switch means may be momentarily adjusted to selective positions, to connect the high-pulse direct current power supply in series circuit with any two elements of a tube, and to reverse the polarity of the voltage applied to the selected elements.

2. In a device of the class described, the combination comprising: a tube socket provided with element poles for connection to the filament, cathode, grids and plate elements of a tube inserted in the socket; a high-pulse direct current power supply; a first switch means interconnected between one side of said high-pulse direct current power supply and said tube socket and being operable to connect said one side of the high-pulse direct current power supply to a selected one of said element poles; a second switch means interconnected between the other side of said high-pulse direct current power supply and said tube socket and being operable to connect said other side of the high-pulse direct current power supply to a selected one of said element poles, whereby, said switch means may be momentarily adjusted to selective positions, to connect the high-pulse direct current power supply in series circuit with any two elements of a tube, and to reverse the polarity of the voltage applied to the selected elements; an alternating voltage power supply; and, a third switch means interconnected between said alternating voltage power supply and the filament element poles of said socket for selective connection thereof for normal filament excitation.

3. The device as defined in claim 2, wherein: a potentiometer is connected in said high-pulse direct current power supply for varying the power output to the tube elements interconnected by said first and second switch means.

4. The device as defined in claim 3, wherein: a potentiometer is connected in said alternating current power supply for varying the power output to said filament.

5. In a device of the class described, the combination comprising: a tube socket provided with element poles for connection to the filament, cathode, grids and plate elements of a tube inserted in the socket; a high-pulse direct current power supply; a first switch means interconnected between one side of said high-pulse direct current power supply and said tube socket and being operable to connect said one side of the high-pulse direct current power supply to a selected one of said element poles; a second switch means interconnected between the other side of said high-pulse direct current power supply and said tube socket and being operable to connect said other side of the high-pulse direct current power supply to a selected one of said element poles, whereby, said switch means may be momentarily adjusted to selective positions, to connect the high-pulse direct current power supply in series circuit with any two elements of a tube, and to reverse the polarity of the voltage applied to the selected elements; said high-pulse direct current power supply including a transformer having the primary thereof connected to an alternating current power supply and the secondary thereof connected to the plate of a rectifier tube, a potentiometer connected to said secondary and to the plate of said rectifier tube and to said first switch means, and the cathode of said rectifier tube being connected to said second switch means, whereby, said switches are polarized B minus and B plus, respectively, relative to one another and said socket.

6. The device as defined in claim 5, wherein: said power supply further includes a condenser-capacitor to produce a high-pulse unfiltered direct current.

7. The device as defined in claim 5, wherein: a meter having voltage and current scales is connected with the power supply in said circuit by means of a switch which is arranged for switching the meter to the voltage scale of the meter for indicating the tube condition, and for switching the meter to the current scale for indicating deflections of the current when normal current is flowing in said circuit which indicates leakage shorts.

8. In a device of the class described, the combination comprising: a tube socket provided with element poles for connection to the filament, cathode, grids and plate elements of a tube inserted in the socket; a high-pulse direct current power supply; a first multi-position switch having outer poles connected to said socket element poles; said first switch having a center pole connected to the B plus side of said direct current power supply and a movable arm selectively disposable between said center pole and each of said outer poles on said first switch; a second multi-position switch having outer poles connected to said socket element poles; and, said second switch having a center pole connected to the B minus side of said direct current power supply and a movable arm selectively disposable between said center pole and each of said outer poles on said second switch; whereby, said switch poles may be adjusted to selective positions to connect the high-pulse direct current power supply in series circuit with any two elements of a tube, and to reverse the polarity of the voltage applied to the selected elements.

9. In a device as set forth in claim 8, a third multi-position switch having a centter pole and outer poles selectively connectable to said socket poles, a fourth multi-position switch having a center pole and outer poles selectively connectable to said socket poles, an alternating current power source connected to said third and fourth switches center poles, and a switch arm disposed on said third and fourth switches center poles for selectively connecting said second power source to said third and fourth switches outer poles and across a pair of tube elements in said socket.

10. In a device as set forth in claim 9, said third and fourth switch arms are mechanically interconnected for gang operation.

References Cited in the file of this patent

UNITED STATES PATENTS 2,717,190    Shoup  ---------------- Sept. 6, 1955